United States Patent
Ficner et al.

(10) Patent No.: US 10,550,952 B1
(45) Date of Patent: Feb. 4, 2020

(54) METHOD AND APPARATUS FOR PARKING A RETURN SPRING HVAC ACTUATOR AT A CLOSED POSITION

(71) Applicant: Honeywell International Inc., Morris Plains, NJ (US)

(72) Inventors: Ondrej Ficner, Bucovice (CZ); Petr Senfluk, Brno (CZ); Frantisek Krivanek, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/125,116

(22) Filed: Sep. 7, 2018

(51) Int. Cl.
*F24F 11/00* (2018.01)
*F16K 31/04* (2006.01)
*F24F 13/14* (2006.01)

(52) U.S. Cl.
CPC .......... *F16K 31/046* (2013.01); *F16K 31/045* (2013.01); *F24F 13/1426* (2013.01); *F24F 2013/146* (2013.01); *F24F 2013/1433* (2013.01)

(58) Field of Classification Search
CPC ... F16K 31/046; F16K 31/045; F24F 13/1426
See application file for complete search history.

(56) References Cited

U.S. PATENT DOCUMENTS

| | | | |
|---|---|---|---|
| 5,970,997 A * | 10/1999 | Hudson | F16K 31/046 137/1 |
| 6,184,604 B1 | 2/2001 | Takano et al. | |
| 6,249,100 B1 | 6/2001 | Lange | |
| 6,495,981 B2 | 12/2002 | Romanowich et al. | |
| 6,979,965 B2 | 12/2005 | McMillan et al. | |
| 7,411,145 B1 | 8/2008 | Jones et al. | |
| 8,084,982 B2 | 12/2011 | Grabinger et al. | |
| 9,465,370 B2 | 10/2016 | Alexander et al. | |
| 9,509,242 B2 | 11/2016 | Diamond et al. | |
| 9,509,243 B2 | 11/2016 | Viscardi et al. | |
| 9,641,122 B2 | 5/2017 | Romanowich et al. | |
| 2015/0112456 A1 * | 4/2015 | Sikora | G05D 23/1902 700/83 |

FOREIGN PATENT DOCUMENTS

| | | |
|---|---|---|
| CN | 103621483 A | 3/2014 |
| EP | 2143118 A2 | 1/2010 |
| JP | 2015068452 A | 4/2015 |
| JP | 2017082813 A | 5/2017 |

\* cited by examiner

*Primary Examiner* — Muhammad S Islam
(74) *Attorney, Agent, or Firm* — Seager Tufte & Wickhem LLP (57) ABSTRACT

An HVAC actuator that includes a motor to assist in driving an HVAC component between a first end stop and a second end stop, a return spring configured to provide a bias force toward the second end stop, and a controller operatively coupled to the motor. The controller may store a predetermined zero position that corresponds to the position of the HVAC component that results when the HVAC component is allowed to come to rest against the second end stop under the influence of the bias force of the return spring while the motor is interrupted from controlling the position and speed of the HVAC component. The controller may be configured to remove drive power to the motor before the HVAC component 14 reaches the predetermined zero position, allowing the return spring to gently park the HVAC component on the send end stop.

20 Claims, 3 Drawing Sheets

METHOD AND APPARATUS FOR PARKING A RETURN SPRING HVAC ACTUATOR AT A CLOSED POSITION

TECHNICAL FIELD

The present disclosure generally relates to HVAC systems, and more particularly to actuators for actuating HVAC devices of HVAC systems.

BACKGROUND

Heating, Ventilation and/or Air Conditioning (HVAC) systems are commonly used to condition air within buildings and other structures. Such HVAC systems often include a heat source such as a furnace or a boilers, a cooler such as an air conditioner, a ventilator, one or more controllers and/or other HVAC devices. Some HVAC systems include one or more actuatable devices, such as valves and/or other actuatable devices. Such valves may include, for example, air dampers, water valves, gas valves, ventilation flaps, louvers, and/or any other suitable device that may help regulate or control the flow of fluid (liquid or gas).

Some actuators may use a spring return to assist in closing/opening the actuator. In some instances, when the actuator reaches an end stop, a motor stall condition may occur, causing unwanted stress on the actuator and/or other components. What would be desirable is a spring return actuator that reduces the stress on the actuator and/or other components when the actuator reaches an end stop.

SUMMARY

The present disclosure generally relates to HVAC systems, and more particularly to actuators for actuating HVAC devices of HVAC systems.

In a first example, an HVAC actuator for driving an HVAC component between a first end stop and a second end stop may comprise a return spring configured to provide a bias force that biases the HVAC component toward the second end stop, a motor configured to control a position and speed of the HVAC component between the first end stop and the second end stop, a position sensor for tracking the position of the HVAC component, a memory for storing a zero position of the HVAC component, and a controller operatively coupled to the motor, the position sensor and the memory. The zero position may correspond to the position of the HVAC component that results when the HVAC component is allowed to come to rest against the second end stop under the influence of the bias force of the return spring while the motor is interrupted from controlling the position and speed of the HVAC component. The controller may be configured to control the motor to control the position and speed of the HVAC component when moved toward the second end stop, monitor the current position of the HVAC component via the position sensor, interrupt the motor from controlling the position and speed of the HVAC component before the current position of the HVAC component reaches the zero position, and allow the HVAC component to come to rest against the second end stop under the influence of the bias force of the return spring while the motor remains interrupted from controlling the position and speed of the HVAC component.

In another example, an HVAC actuator for driving an HVAC component between a first end stop and a second end stop may comprise a return spring configured to provide a bias force that biases the HVAC component toward the second end stop, a motor configured to control a position and speed of the HVAC component between the first end stop and the second end stop, and a controller operatively coupled to the motor. The controller may be configured to control the motor to move the HVAC component toward the second end stop while controlling the position and speed of the HVAC component, interrupt the motor from controlling the position and speed of the HVAC component before the HVAC component reaches a zero position, wherein the zero position corresponds to the position of the HVAC component that results when the HVAC component is allowed to come to rest against the second end stop under the influence of the bias force of the return spring while the motor is interrupted from controlling the position and speed of the HVAC component, and allow the HVAC component to come to rest against the second end stop under the influence of the bias force of the return spring while the motor remains interrupted from controlling the position and speed of the HVAC component.

In another example, a method for operating an HVAC actuator that drives an HVAC component between a first end stop to a second end stop, wherein the HVAC actuator includes a return spring that provides a bias force that biases the HVAC component toward the second end stop, may comprise controlling a motor to move the HVAC component toward the second end stop while controlling a position and speed of the HVAC component, interrupting the motor from controlling the position and speed of the HVAC component before the HVAC component reaches a zero position, wherein the zero position corresponds to the position of the HVAC component that results when the HVAC component is allowed to come to rest against the second end stop under the influence of the bias force of the return spring while the motor is interrupted from controlling the position and speed of the HVAC component, and allowing the HVAC component to come to rest against the second end stop under the influence of the bias force of the return spring while the motor remains interrupted from controlling the position and speed of the HVAC component.

The above summary is not intended to describe each disclosed embodiment or every implementation of the disclosure. The Description which follows more particularly exemplifies these embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

Figure 1:
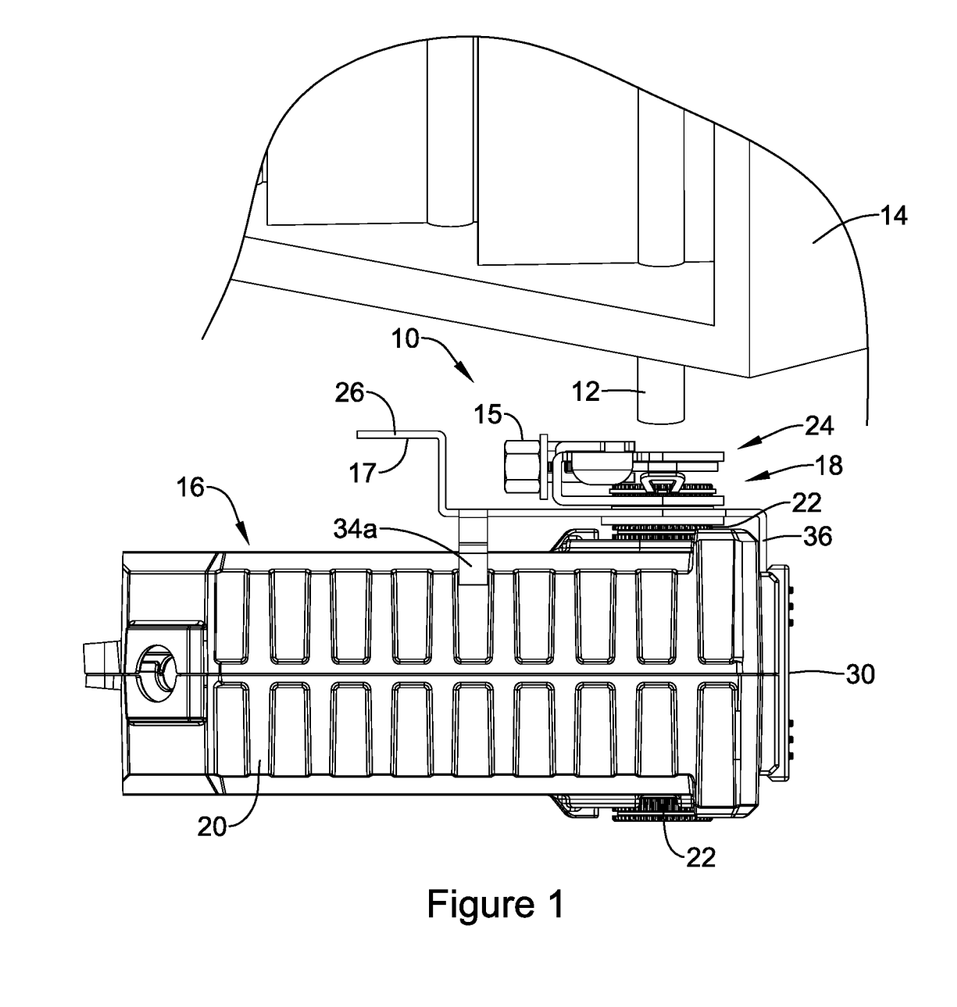
FIG. 1 is a perspective view of an illustrative HVAC valve actuator for driving an air damper of an HVAC system.

The disclosure relates generally to HVAC component actuators such as spring return actuators. FIG. 1 is a perspective view of an illustrative but non-limiting valve actuator 10 for driving a valve shaft, such as a shaft 12 of an HVAC air damper 14. The illustrative valve actuator 10 includes an actuator 16 and an actuator mounting assembly 18. The actuator 16 includes a housing 20 that contains an electric motor (not shown) for rotating a drive tube (not shown). In the example shown, a drive member 22 extends into the drive tube and is driven by the drive tube. The drive tube may have splines, grooves, teeth or other features on the inside surface to engage corresponding splines, grooves, teeth or other features on the outer surface of the drive member 22 so that rotational force of the drive tube by the electric motor may be transferred to the drive member 22. While FIG. 1 shows the shaft 12 of the HVAC air damper 14 spaced from the valve actuator 10, during use, the shaft 12 is inserted into the actuator mounting assembly 18 and secured relative to the drive member 22 by rotating a clamp nut 15 that causes a clamp to clamp the actuator mounting assembly 18 to the shaft 12. The In the example shown, the actuator mounting assembly 18 combines a shaft adapter 24 and an anti-rotation bracket 26. The anti-rotation bracket 26 may be secured relative to the HVAC air damper 14 such that the anti-rotation bracket 26 does not rotate relative to the HVAC air damper 14. The shaft adapter 24 may be a self-centering shaft adapter or a non-self-centering shaft adapter. The shaft adapter 24 shown in FIG. 1 is a non-self-centering shaft adapter. With a non-self-centering shaft adapter, the shaft adapter 24 and anti-rotation bracket 26 may not rotate with the shaft 12 but may oscillate back and forth in a direction that is orthogonal to the axis of the shaft 12 as the shaft 12 is rotated by the actuator 16 by virtue of being off-center from the rotation axis of the shaft 12. In contrast, a self-centering shaft adapter automatically centers the shaft adapter with respect to the valve shaft as the shaft adapter is secured to the valve shaft. With a self-centering shaft adapter, the shaft adapter and anti-rotation bracket may remain relatively stationary relative to the valve shaft 12 as the valve shaft 12 is rotated by the actuator 10.

In some cases, the actuator mounting assembly 18 may be secured to the valve shaft 12 without the actuator 16 present. This can make it easier to mount the actuator mounting assembly 18, including the anti-rotation bracket 26, especially in cramped spaces. In some cases, the actuator 16 may be wired where it is convenient, and then moved to the actuator mounting assembly 18 and secured to the mounted actuator mounting assembly 18, sometimes with a simple snap attachment. In some cases, a button, lever or other mechanism 30 may release the actuator 16 from the actuator mounting assembly 18 for easy removal.

In some cases the actuator 16 and the actuator mounting assembly 18 are configured so that the actuator 16 may be mountable to the actuator mounting assembly 18 in two different orientations. In one orientation, the actuator 16 may rotate the valve shaft 12 via the actuator mounting assembly 18 in a clock-wise direction, and in the other orientation, the actuator 16 may rotate the valve shaft 12 in a counter-clock-wise direction. In the example shown in FIG. 1, the drive tube (not shown) of the actuator 16 may extend through the housing 20 and out the other side, such that the drive member 22 may engage the other side of the drive tube of the actuator 16 if desired, such as when it is desirable to change the orientation of the actuator 16 relative to the actuator mounting assembly 18 (e.g. when it is desirable to reverse the drive direction of the drive member 22). This may allow the shaft adapter 24 of the actuator mounting assembly 18 to engage the drive tube in each of two orientations of the actuator 16. The drive direction of the valve shaft 12 can be changed by simply pushing the button, lever or other mechanism 30 to release the actuator 16 from the actuator mounting assembly 18, re-orientate the actuator 16 (e.g. flipping the actuator 16 over 180 degrees), and then re-attached the actuator 16 to the actuator mounting assembly 18. This can typically be easily accomplished even in cramped spaces.

In the example shown, the anti-rotation bracket 26 includes side arms 34a that are configured to receive the housing 20 of the actuator 16. The illustrative anti-rotation bracket 26 also includes a front arm 36 with latching features. In the example shown, the front arm 36 is configured to extend into a slot in the front side of the housing 20 of the actuator 16. The actuator release lever 30, which in FIG. 1 toggles about pin (not explicitly shown), can be used to capture and release the latching features of the front arm 36 to secure and release the actuator 16 relative to the actuator mounting assembly 18. The illustrative anti-rotation bracket 26 also includes a securement arm 17 that extends up to be flush with an outer surface of the HVAC air damper 14. The securement arm 17 may include an aperture or slot to receive a securement such as a screw that is secured to the HVAC air damper 14 to prevent the anti-rotation bracket 26 and thus the actuator from rotating relative to the HVAC air damper 14.

While FIG. 1 shows the valve actuator 10 driving a shaft 12 of an HVAC air damper 14, it is contemplated that the valve actuator 10 may be used to drive any suitable valve (or other) shaft including but not limited to water valves within hydronic heating and/or cooling systems, other fluid or gas valves, and/or any other actuatable device as desired. Moreover, while a particular illustrative valve actuator 10 is shown in FIG. 1, it is contemplated that any suitable valve actuator may be used.

Figure 2:
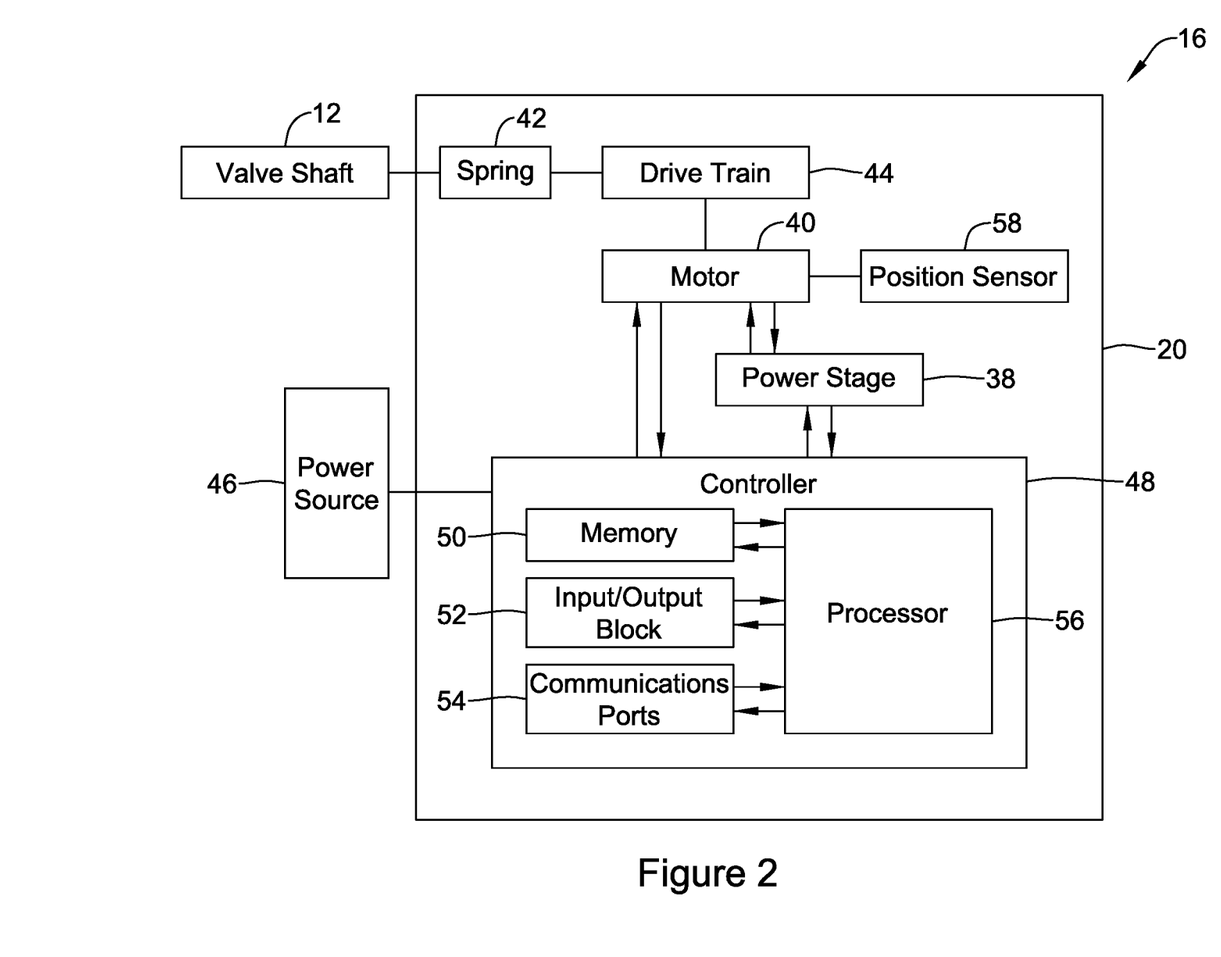
FIG. 2 is a schematic block diagram of the illustrative HVAC valve actuator of FIG. 1.

FIG. 2 is a schematic block diagram of an illustrative but non-limiting example of a spring return actuator 16. The spring return actuator 16 may include a motor 40 positioned within the housing 20. It is contemplated that the motor 40 may be a DC motor, an AC motor, a stepper motor, or any other suitable type of motor, as desired. The torque output of the motor 40 may be adjustable by, for example, altering the current (or voltage) that is applied to the motor 40. Likewise, the maximum output torque of the motor 40 may be set by limiting or clipping the current (or voltage) that is applied to the motor 40. The motor 40 may stall when the load on the motor exceeds the maximum output torque of the motor 40. A power source 46 may provide power to the spring return actuator 16. The power source 46 may reside within the housing 20 such as when the spring return actuator 16 is battery powered, or may reside external to the housing 20 of the actuator 16, such as when the spring return actuator 16 is powered by line power.

In the illustrative embodiment, motor 40 may engage a drive train 44 (which may include at least the drive tube and/or drive member 22). In some cases, the drive train 44 may function as a transmission, taking a relatively high speed, low torque output from the motor 40 and turning it into a relatively low speed, high torque output that is suitable for driving a valve shaft 12 of an HVAC component 14 between two or more positions. As described above, the HVAC component 14 may, for example, be an air damper, a fluid valve such as a ball valve, or the like. In some instances, the particular gearing present within the drive train 44 may be customized to provide an appropriate balance of speed and torque, depending on the physical characteristics and/or requirements of the HVAC component 14. It will be appreciated, for example, that the torque necessary to open and/or close an air damper may be quite different from the torque needed to open and/or close a liquid valve such as a ball valve. The drive train 44 may be configured to have an appropriate speed reduction and thus provide an appropriate level of torque. For example, the drive train 44 may provide a speed reduction of about 1600:1, about 2000:1, about 3000:1, or any other suitable speed reduction as desired.

In some instances, the spring return actuator 16 may include a spring or other bias mechanism 42. While the bias mechanism is schematically illustrated as being disposed to provide a bias force at the output of the drive train 44, it will be appreciated the spring or bias mechanism 42 may apply the bias force to any suitable location along the drive path. In some cases, for example, the bias mechanism 42 may be located outside of the housing 20. In some cases, the bias mechanism 42 may be part of the HVAC component 14.

The bias mechanism 42 may be any suitable structure that can provide a bias force that opposes at least one driving direction of the motor 40. In some cases, the bias mechanism 42 may be a resilient material such as a rubber, a gas cylinder, a hydraulic component, or the like. In some instances, the bias mechanism 42 may be one or more return springs. The HVAC component 14 may have a first end stop (e.g. fully open position) and a second end stop (e.g. fully closed position), and the motor 40 may control the position and speed of the HVAC component between the first end stop and the second end stop, sometimes when moving in both directions. In some cases, the bias mechanism 42 may provide a bias force that biases the HVAC component toward the second end stop (e.g. the fully closed position). In other cases, the bias mechanism 42 may provide a bias force that biases the HVAC component toward the first end stop (e.g. the fully open position).

In some cases, the spring return actuator 16 may include a controller 48. The controller 48 may, for example, monitor and/or adjust the position and speed of the motor 40. In some cases, the controller 48 may alter the speed the of motor 40 in order to slow down the motor 40 when approaching an end stop in the drive train 44 and/or HVAC component 14. The controller 48 may be operatively coupled to a power stage 38. The power stage 38 may be configured to provide drive power to the motor 40 to assist in driving the HVAC component 14 in response to control logic received from the controller 48. In some embodiments, the power stage 38 may be incorporated into the controller 48. In some cases, the controller 48 itself may provide drive power to the motor 40 and the power stage 38 may be omitted.

In some cases, the spring return actuator 16 may include one or more sensors 58 that are in communication with the controller 48 to provide the controller 48 with information pertaining to the speed of the motor 40 and/or the relative position of the motor 40, drive train 44 and/or HVAC component 14. In some illustrative embodiments, the spring return actuator 16 may include a position sensor 58 that is disposed proximate to the motor 40 (or part of the motor 40) and that is in communication with controller 48. Alternatively, or in addition, the spring return actuator 16 may include a position sensor (not shown) that is disposed proximate to the drive train 44 and/or HVAC component 14 and is in communication with controller 48. In some cases, the position sensor may be a hall-effect sensor, an optical sensor, a potentiometer, a mechanical switch type sensor, and/or any other suitable sensor that can be used to detect and track the position of the HVAC component 14 along its range of motion between the first and second end stops.

In some cases, the position sensor(s) 58 may be part of the motor 40. For example, the motor 40 may be a brushless DC motor that includes the position sensors 58. The position sensor 58 may include one or more hall-effect sensors, such as one or more latching hall-effect sensors, to measure the position of the motor 40, which may be communicated to a motor controller to apply energy to the motor at the right time and right orientation. In some cases, the motor controller may be part of the motor 40, while in other cases the motor controller may be part of the controller 48. The movement of the motor 40, and thus the position of the HVAC component 14 along its range of motion between the first and second end stops, may be tracked using for example a counter that is incremented each time a hall-effect sensor of the motor 40 detects a rotation event associated with rotation of the motor 40 in a first direction, and is decremented each time the hall-effect sensor detects a rotation event associated with rotation of the motor 40 in a second opposite direction. In some cases, the counter may have a first value when the HVAC component 14 is at a zero position and a second value when the HVAC component 14 is at the first end stop. The counter may be implemented using the processor 56 and sometimes in combination with the memory 50. Alternatively, the counter may be separately provided. In some cases, the counter may be part of a motor controller.

The controller 48 may calibrate the counter to the zero position of the HVAC component by, for example, interrupting the motor 40 from controlling the position and speed of the HVAC component 14 when the HVAC component 14 is between the second end stop and the first end stop, allowing the HVAC component 14 to come to rest against the second end stop under the influence of the bias force of the return spring 42 with the motor 40 interrupted from controlling the position and speed of the HVAC component 14, and then resetting the counter. When the motor 40 is "interrupted", drive power to the motor 40 may be removed such that the motor 40 does not actively control the position and speed of the HVAC component 14. However, in some cases, the position of the motor 40 may still be tracked (e.g. via the counter) even when the motor 40 is "interrupted".

In some instances, the motor 40 may be a stepper motor, and the position of the motor/movement of the motor 40 and thus the position of the HVAC component 14 may be tracked by counting the number of motor steps. In other cases, the position sensor 58 may sense the movement of the drive train, or may directly sense the position of the HVAC component 14, as desired.

In some instances, the controller 48 may alter and/or limit the current (and/or voltage) that is provided to the motor 40 in order to adjust a maximum output torque provided by the motor 40 and/or drive train 44. In some cases, the amplitude of the current (and/or voltage) may be controlled and/or limited. In other cases, other characteristics of the current and/or voltage may be altered or limited. For example, when the motor 40 is driven by a Pulse Width Modulated (PWM) signal, the controller 48 may alter or limit the pulse width of the PWM signal.

It is contemplated that controller 48 may be programmed or otherwise configured to control the operation of motor 40. The illustrative actuator controller 48 includes a processor, microprocessor, or other processing device 56. The actuator controller 48 may be adapted or configured to operate in accordance with an algorithm that controls or at least partially controls portions of the actuator 16. The actuator controller 48 may include a memory block 50 that may be considered as being electrically connected to the processor 56. The memory block 50 may be used to store any desired information, such as the aforementioned control algorithm, end stop positions, counter values, and the like. The processor 56 may store information within memory block 50 and may subsequently retrieved the stored information. The memory block 50 may be any suitable type of storage device, such as RAM, ROM, EPROM, a flash drive, a hard drive, and the like. The processor 56 may itself include memory.

In many cases, the actuator controller 48 may include an input/output block (I/O block) 52 having a number of wire terminals for receiving one or more wires from the power source 46 and/or from an external controller. While the term I/O may imply both input and output, it is intended to include input only, output only, as well as both input and output signals. The I/O block 52 may be used to communicate one or more signals to and/or from the actuator 16. The actuator controller 48 may have any number of wire terminals for accepting connections, depending on the particular configuration of the actuator 16.

In some cases, as illustrated, the actuator controller 48 may include a communications or data port 54. The communication ports 54 may be configured to communicate with the processor 56 and may, if desired, be used to either upload information to the processor 56, download information from the processor 56, provide commands to the processor 56, send commands from the processor 56, and/or perform any other suitable task. The communication port 54 may be a wireless port such as a Bluetooth™ port or any other wireless protocol. In some cases, communication port 54 may be a wired port such as a serial port, a parallel port, a CAT5 port, a USB (universal serial bus) port, or the like. In some instances, the communication port 54 may be a USB port and may be used to download and/or upload information from a USB flash drive. Other storage devices may also be employed, as desired. In some cases, a separate device (not explicitly shown) may be in communication with the processor 56 of the actuator controller 48.

In some embodiments, as noted above, a bias mechanism 42 may be provided, and may include a return spring that opposes the driving force of the motor 40. When so provided, the controller 48 may be configured to, for example, operate the motor 40 in a manner that permits the motor 40 to provide a maximum output torque at the output of the HVAC actuator that remains constant or at least substantially constant over at least a portion of a range of motion of the HVAC actuator 16. In some cases, the output torque may be constant or at least substantially constant over all or substantially all of the range of motion of HVAC actuator 16. In some cases, the controller 48 may provide a torque output limit at the output of the motor 40 that increases in accordance with the increasing return spring bias force provided by the return spring over all or substantially all of the range of motion of the HVAC actuator.

In some instances, the drive train 44 may have an output shaft or gear that drives the HVAC component 14. The output shaft or gear may be considered as rotating through a range of motion. In some instances, the range of motion may be defined not in terms of the rotation of the output shaft, but rather in terms of the rotation or other movement of HVAC component 14 in response to the rotating output shaft or gear. In some cases, the range of motion may be defined as the path traveled (either via the output shaft or HVAC component 14) between end points.

Figure 3:
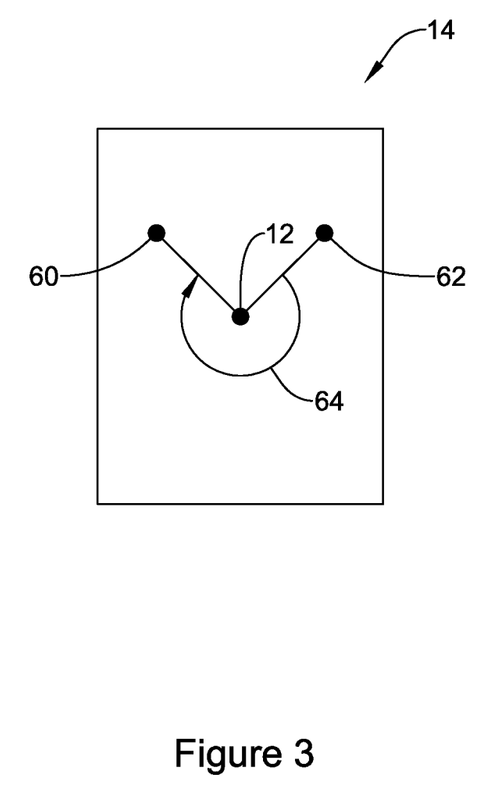
FIG. 3 is a schematic view of an illustrative HVAC component that may be actuated via the valve actuator of FIG. 2.

Turning briefly to FIG. 3, an illustrative HVAC component 14 is schematically shown as having a shaft 12 that may, for example, be driven by the drive train 44 (FIG. 2) and the motor 40. If the HVAC component 14 is an air damper, the shaft 12 may rotate the air damper blade. If the HVAC component 14 is a fluid valve such as a ball valve, the shaft 12 may rotate the ball valve. In FIG. 3, the illustrative HVAC component 14 is seen as including a first end stop 60 and a second end stop 62, with a range of motion or stroke 64 defined therebetween. In some cases, the first end stop 60 and/or the second end stop 62 may represent mechanical limits of the drive train 44 (FIG. 2) or the HVAC component 14. In some instances, the first end stop 60 and/or the second end stop 62 may be adjustable end points that may, for example, be set by an installer to prevent damage or set other limits to particular aspects or portions of HVAC component 14. In some embodiments, the first end stop 60 may correspond to a fully open position and the second end stop 62 may correspond to a fully closed position, although the reverse configuration is also contemplated.

Returning back to FIG. 2, and in some illustrative embodiments, the controller 48 may be configured to instruct motor 40, perhaps by controlling the current (and/or voltage) provided to the motor 40, to output to the drive train 44 an amount of torque that equals or substantially equals a rated torque value plus an amount that is related to the magnitude (but opposite in direction) of the opposing torque provided to the drive train 44 by the bias mechanism 42. The rated torque may be a predetermined value that provides sufficient torque to sufficiently move the HVAC component 14. In other words, the controller 48 may be configured to instruct the motor 40 to provide a maximum output torque that varies with the opposing torque provided by the bias mechanism 42, to thereby provide a constant or substantially constant net torque to the HVAC component 14 across the range of motion 64 of the HVAC component 14. In some instances, the controller 48 may be considered as regulating the motor 40 to provide a variable maximum allowed torque. The maximum allowed output torque may, for example, vary with respect to position along the range of motion 64 (FIG. 3).

As detailed above, the HVAC component 14 may be driven by a brushless DC motor 40 that includes a position sensor 58, such as a hall-effect sensor. It is contemplated that the hall-effect sensor 58 may be calibrated at the zero position at the time of manufacture. Alternatively, or in addition, the hall-effect sensor 58 may be calibrate at the time of installation of the actuator 16. For example, with no power being supplied to the motor 40 and the bias mechanism 42 biasing the actuator toward the second end stop position 62 (see FIG. 3), a hall count may be set to zero. This may be considered the zero position. In some cases, the calibration position may be stored in the memory 50 of the controller 48.

The actuator controller 48 may be configured to control and/or monitor the position or state of the HVAC component 14 and/or perform other functions and analyses, as desired. In some cases, the actuator controller 48 may be configured to close or open HVAC component 14 on its own volition, in response to control signals or commands from other systems or appliances (e.g., a system level controller, central building controller, or HVAC appliance controller), and/or in response to received measures related to sensed parameters, as desired.

It is contemplated that the position of the actuator (e.g., corresponding to 30% open, 50% open or 75% open, etc.) may be tracked by the actuator controller 48. In some cases, the position of the actuator may be tracked using the hall count mentioned above. The position sensor 58 may be a hall-effect sensor 58 that includes a hall counter that is incremented as the actuator moves toward the first end stop 60 and decremented as the actuator moves toward the second end stop 62. As noted above, the hall counter may be "zeroed" out at the zero position. In some cases, the hall counter may be maintained in the memory 50 of the actuator controller 48.

To match an expected position (e.g., software position) with the real mechanical position of the HVAC component 14, the memory 50 may store an algorithm configured to correlate the hall counter value (or stepper motor counter value, if so provided) with an actual physical position of the drive train 44 and thus the HVAC component 14 between the second end stop 62 and the first end stop 60. To determine the hall counter value at the fully open configuration, the controller 48 may be configured to drive the drive train 44 from the second end stop 62 to the first end stop 60 at full speed. The motor 40 may stall when the first end stop 60 is contacted and the hall count may be recorded as the first motor stall position. The drive train 44 and/or HVAC component 14 may contact the first end stop 60 while the motor 40 is still turning causing the motor 40 to stall. Because driving the motor to the stall position may cause undue wear and tear on the motor 40, drive train 44 and/or HVAC component 14, the controller 48 may be configured to store the recorded Hall count at stall, minus or less an offset, as the fully open position, or the value of the full stroke 64. In one example, when the full stroke is in the range of about 50,000 to about 60,000 Hall counts, the offset may be in the range of about 50 to about 500 Hall counts.

It is contemplated that after the initial calibration of the zero position and the full stroke 64, the controller 48 may be configured to control the motor 40 such that the motor 40 stops rotational movement or slows a predetermined distance from the first end stop 60. The motor 40 may remain powered on in a holding mode to maintain the drive train 44 and thus the HVAC component 14 at the desired position, against the force applied by the bias mechanism 42. In some cases, the predetermined distance may be in the range of about 200 to about 400 Hall counts or about one to two degrees (in the rotational direction) from the first end stop 60. Placing the motor 40 in a holding mode prior to reaching the motor stall point may reduce the stress on the actuator 16 by, for example, reducing elastic twisting of the drive train.

During operation, the controller 48 may be configured to provide drive power to the motor 40 (sometimes via a power stage 38) to move the HVAC component 14 between the second end stop 62 and the first end stop 60. The controller 48 may be configured to track, identify, and/or store the position of the HVAC component 14 over time. During use, the controller 48 may cause the motor 40 to modulate the position of the HVAC component 14 to regulate an environmental condition in a building. With the HVAC component 14 is in the desired position, the controller 48 may be configured to remove the drive power from the motor and apply a holding power to maintain the position of the HVAC component 14. The position of the HVAC component 14 may then again be modulated to another position as requested by the controller 48, a system level controller, a central building controller, an HVAC appliance controller or the like.

During operation, as the HVAC component 14 is moved towards the first end stop 62, the spring or bias mechanism 42 stores potential energy. This stored potential energy may be sufficient to drive the HVAC component 14 back to the second end stop 62 when the controller 48 commands the motor 40 to exit the holding mode and move the HVAC component 14 towards the second end stop 62. It is contemplated that the bias mechanism 42 may be pre-wound such that the tension or stored potential energy of the bias mechanism 42 is capable of moving the HVAC component 14 to the fully closed configuration (e.g., the calibrated zero position). While the motor 40 may not be required to physically move the HVAC component to the fully closed position because of the closing force applied by the bias mechanism 42, the motor 40 may be used to regulate the speed and/or position of the HVAC component while moving the HVAC component 14 toward the second end stop 62.

In some cases, the controller 48 may be configured to remove power from the motor 40, while continuing to track the position of the HVAC component 14, when the HVAC component 14 reaches a predetermined position relative to the calibrated zero position. In some cases, the second end stop 62 may be mechanically contacted by the HVAC component 14 before the HVAC component 14 reaches the calibrated zero position (e.g., where the Hall count is equal to 0). To help provide a soft landing, the controller 48 may be configured to remove power from the motor 40 at about 200 to about 400 Hall counts or about 0.5 to two degrees (in the rotational direction) before the HVAC component 14 reaches the zero position. Once power is removed, the bias mechanism 42 moves the drive train 44 the remaining way to the second end stop 62 (e.g., to a Hall count zero position). The position of the HVAC component 14 may continue to be tracked. The motor 40 may remain disabled until the controller 48 commands the HVAC component 14 to again open. Operating in this manner may reduce noise of the actuator 16 and remove stress from various components.

More generally, it is contemplated that disabling and/or slowing the motor 40 prior to the HVAC component 14 contacting the end stops 60/62 and/or the motor 40 stalling to gently park the HVAC component 14 at the stroke ends 60, 62 may reduce the stress on the actuator 16. This may increase the functional life of the actuator 16 as the actuator 16 may experience fewer mechanical fatigue failures and/or function longer before mechanical failure. It is further contemplated there may be less audible noise. For example, less contact force between the HVAC component 14 and/or the drive train 44 and the mechanical end stops 60, 62 may result in less audible noise from the actuator 16. Also, the overall power consumption of the actuator 16 may be reduced by reducing the power consumption of the motor 40 in the closed configuration and by reducing the power consumption of the motor 40 as the drive train 44 is moved to the closed configuration. Also, reducing and/or eliminating motor stalls can reduce peak current events.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

What is claimed is:

1. An HVAC actuator for driving an HVAC component between a first end stop and a second end stop, comprising:
a return spring configured to provide a bias force that biases the HVAC component toward the second end stop;
a motor configured to control a position and speed of the HVAC component between the first end stop and the second end stop;
a position sensor for tracking the position of the HVAC component;
a memory for storing a zero position of the HVAC component, wherein the zero position corresponds to the position of the HVAC component that results when the HVAC component is allowed to come to rest against the second end stop under the influence of the bias force of the return spring while the motor is interrupted from controlling the position and speed of the HVAC component;
a controller operatively coupled to the motor, the position sensor and the memory, the controller configured to:
control the motor to control the position and speed of the HVAC component when moved toward the second end stop;
monitor the current position of the HVAC component via the position sensor;
interrupt the motor from controlling the position and speed of the HVAC component before the current position of the HVAC component reaches the zero position; and
allow the HVAC component to come to rest against the second end stop under the influence of the bias force of the return spring while the motor remains interrupted from controlling the position and speed of the HVAC component.

2. The HVAC actuator of claim 1, wherein the position sensor comprises a hall sensor that detects rotation events associated with rotation of the motor.

3. The HVAC actuator of claim 2, wherein the position sensor includes a counter that counts the rotational events detected by the hall sensor, wherein the counter has a first value when the HVAC component is at the zero position and a second value when the HVAC component is at the first end stop.

4. The HVAC actuator of claim 3, wherein the controller is configured to calibrate the counter to the zero position of the HVAC component by interrupting the motor from controlling the position and speed of the HVAC component when the HVAC component is between the second end stop and the first end stop, allowing the HVAC component to come to rest against the second end stop under the influence of the bias force of the return spring with the motor interrupted from controlling the position and speed of the HVAC component, and resetting the counter.

5. The HVAC actuator of claim 4, wherein the controller is configured to repeatedly calibrate the counter to the zero position of the HVAC component from time to time.

6. The HVAC actuator of claim 3, wherein the counter uses the memory.

7. The HVAC actuator of claim 1, further comprising a power stage operatively coupled to the controller and the motor, the power stage configured to provide drive power to the motor under the control of the controller to control the position and speed of the HVAC component between the first end stop and the second end stop.

8. The HVAC actuator of claim 1, further comprising a drive train operatively coupled between the motor and the HVAC component, wherein the drive train is driven by the motor to assist in driving the HVAC component between the first end stop to the second end stop.

9. The HVAC actuator of claim 1, wherein the controller is further configured to:
control the motor to drive the HVAC component toward the first end stop;
monitor the current position of the HVAC component via the position sensor;
control the motor to stop the HVAC component after the HVAC component engages the first end stop but before the motor stalls, and hold the HVAC component at that position against the bias force of the return spring.

10. An HVAC actuator for driving an HVAC component between a first end stop and a second end stop, comprising:
a return spring configured to provide a bias force that biases the HVAC component toward the second end stop;
a motor configured to control a position and speed of the HVAC component between the first end stop and the second end stop;
a controller operatively coupled to the motor, the controller configured to:
control the motor to move the HVAC component toward the second end stop while controlling the position and speed of the HVAC component;
interrupt the motor from controlling the position and speed of the HVAC component before the HVAC component reaches a zero position, wherein the zero position corresponds to the position of the HVAC component that results when the HVAC component is allowed to come to rest against the second end stop under the influence of the bias force of the return spring while the motor is interrupted from controlling the position and speed of the HVAC component; and
allow the HVAC component to come to rest against the second end stop under the influence of the bias force of the return spring while the motor remains interrupted from controlling the position and speed of the HVAC component.

11. The HVAC actuator or claim 10, wherein the controller is further configured to control the motor to subsequently move the HVAC component away from the second end stop on command.

12. The HVAC actuator of claim 10, further comprises a position tracker for tracking the position of the HVAC component between the first end stop and the second end stop, wherein the position tracker is calibrated to the zero position.

13. The HVAC actuator of claim 12, wherein the position tracker comprises a non-volatile memory that stores the zero position.

14. The HVAC actuator of claim 12, wherein the position tracker comprises a hall sensor.

15. The HVAC actuator of claim 10, further comprising a drive train operatively coupled between the motor and the HVAC component, wherein the drive train is driven by the motor to drive the HVAC component between the first end stop to the second end stop.

16. The HVAC actuator of claim 1, wherein the controller is further configured to:
   control the motor to drive the HVAC component toward the first end stop;
   control the motor to stop the HVAC component after the HVAC component engages the first end stop but before the motor stalls, and hold the HVAC component at that position against the bias force of the return spring.

17. A method for operating an HVAC actuator that drives an HVAC component between a first end stop to a second end stop, wherein the HVAC actuator includes a return spring that provides a bias force that biases the HVAC component toward the second end stop, the method comprising:
   controlling a motor to move the HVAC component toward the second end stop while controlling a position and speed of the HVAC component;
   interrupting the motor from controlling the position and speed of the HVAC component before the HVAC component reaches a zero position, wherein the zero position corresponds to the position of the HVAC component that results when the HVAC component is allowed to come to rest against the second end stop under the influence of the bias force of the return spring while the motor is interrupted from controlling the position and speed of the HVAC component;
   allowing the HVAC component to come to rest against the second end stop under the influence of the bias force of the return spring while the motor remains interrupted from controlling the position and speed of the HVAC component.

18. The method of claim 17, further comprising:
   controlling the motor to drive the HVAC component toward the first end stop;
   controlling the motor to stop the HVAC component after the HVAC component engages the first end stop but before the motor stalls; and
   holding the HVAC component at that position against the bias force of the return spring.

19. The method of claim 17, further comprising tracking the position of the HVAC component between a first end stop to a second end stop.

20. The method of claim 19, tracking the position of the HVAC component using a hall sensor.

* * * * *